United States Patent
Shiina

(10) Patent No.: US 8,527,812 B2
(45) Date of Patent: Sep. 3, 2013

(54) INFORMATION PROCESSING DEVICE

(75) Inventor: Takahiro Shiina, Kanagawa (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 286 days.

(21) Appl. No.: 13/111,944

(22) Filed: May 19, 2011

(65) Prior Publication Data

US 2011/0289357 A1    Nov. 24, 2011

(30) Foreign Application Priority Data

May 20, 2010 (JP) ................................ 2010-116469

(51) Int. Cl.
G06F 11/00 (2006.01)

(52) U.S. Cl.
USPC .......................................... 714/30; 714/47.1

(58) Field of Classification Search
USPC ................. 714/27, 30, 31, 37, 38.1, 45, 47.1, 714/733, 734; 717/128; 712/227
See application file for complete search history.

(56) References Cited

U.S. PATENT DOCUMENTS

| | | | |
|---|---|---|---|
| 2009/0217010 A1* | 8/2009 | Circello et al. | 712/227 |
| 2009/0287907 A1* | 11/2009 | Isherwood et al. | 712/205 |
| 2012/0042212 A1* | 2/2012 | Laurenti | 714/45 |

FOREIGN PATENT DOCUMENTS

| | | |
|---|---|---|
| JP | 2003-76577 A | 3/2003 |
| JP | 2003-162426 A | 6/2003 |

* cited by examiner

*Primary Examiner* — Dieu-Minh Le
(74) *Attorney, Agent, or Firm* — Miles & Stockbridge P.C.

(57) ABSTRACT

The invented device includes a central processing unit(s), each CPU including an execution unit coupled to an operand bus and a control unit that controls operation of the execution unit, based on fetched instructions, and a debugging circuit that obtains trace data about how a program is executed in each CPU. The control unit includes a debugging function unit that collects instruction execution analysis data in the CPU. The debugging circuit includes a trace acquisition circuit(s) that imports instruction execution analysis data collected by the debugging function unit and data received from the operand bus via logic circuits used for separate purposes and a trace output circuit(s) for delivering outside the output of the trace acquisition circuit. In the trace acquisition circuit, a sorting logic unit is provided that sorts instruction execution analysis data collected by the debugging function unit and data received from the operand bus.

10 Claims, 12 Drawing Sheets

FIG. 9

| TYPE OF TRACE | COMPONENTS OF TRACE DATA PACKET WHICH IS OUTPUT FROM AUD 111 (211) | | | | | | WHAT CAN BE KNOWN FROM THE TRACE PACKET |
|---|---|---|---|---|---|---|---|
| BRANCH TRACE PACKET COMPOSITION | CPU NO. TRACED | TYPE OF BRANCH (CAUSE OF BRANCH) | PACKET COMPOSITION INFORMATION | BRANCH DESTINATION ADDRESS | ADDRESS OF BRANCH INSTRUCTION | TIME STAMP | COUNT OF INSTRUCTIONS EXECUTED AFTER THE LAST BRANCH | BRANCH BY A BRANCH INSTRUCTION, A CPU EXCEPTION DETECTED, AND BRANCH OF A PROGRAM BY AN INTERRUPT OR EXCEPTION HANDLING. |
| DATA TRACE PACKET COMPOSITION | CPU NO. TRACED | R/W DATA SIZE ACCESSED | PACKET COMPOSITION INFORMATION | ADDRESS ACCESSED | OPERAND VALUE WRITTEN/READ | TIME STAMP | COUNT OF INSTRUCTIONS EXECUTED AFTER THE LAST BRANCH | DATA READ FROM OR WRITTEN INTO A MEMORY OR I/O REGISTER BY A DATA TRANSFER INSTRUCTION. |
| SLEEP INSTRUCTION TRACE | CPU NO. TRACED | SLEEP INSTRUCTION EXECUTION COMPLETION INFORMATION | INSTRUCTION ADDRESS | TIME STAMP | | | | TRANSITED INTO A LOW POWER CONSUMPTION STATE BY EXECUTING A SLEEP INSTRUCTION. |
| CACHE-RELATED OPERATION INSTRUCTION TRACE | CPU NO. TRACED | INSTRUCTION EXECUTION COMPLETION INFORMATION | ADDRESS ACCESSED | TIME STAMP | COUNT OF INSTRUCTIONS EXECUTED AFTER THE LAST BRANCH | | | EXECUTION AND RELEVANT ADDRESS OF A PREFETCH INSTRUCTION FOR AN INSTRUCTION OR DATA, A CACHE LINE INVALIDATION INSTRUCTION, ETC. |
| LDC/STC INSTRUCTION TRACE | CPU NO. TRACED | INSTRUCTION EXECUTION COMPLETION INFORMATION | INSTRUCTION ADDRESS | TIME STAMP | COUNT OF INSTRUCTIONS EXECUTED AFTER THE LAST BRANCH | | | CPU STATE CHANGED BY EXECUTING AN INSTRUCTION LOADED OR STORED INTO A CONTROL REGISTER OF CPU. |
| LDS/STS INSTRUCTION TRACE | CPU NO. TRACED | INSTRUCTION EXECUTION COMPLETION INFORMATION | INSTRUCTION ADDRESS | TIME STAMP | COUNT OF INSTRUCTIONS EXECUTED AFTER THE LAST BRANCH | | | CPU AND FPU STATES CHANGED BY EXECUTING AN INSTRUCTION LOADED OR STORED INTO A SYSTEM REGISTER OF CPU AND FPU. |
| DEBUGGING DEDICATED INSTRUCTION TRACE | CPU NO. TRACED | DEDICATED INSTRUCTION EXECUTION COMPLETION INFORMATION | TIME STAMP | | | | | CPU OPERATING STATE CHANGED, AS A CPU STOP (BREAK) OR THE LIKE OCCURRED DUE TO THE DEBUGGING DEDICATED INSTRUCTION. |

INFORMATION PROCESSING DEVICE

CROSS-REFERENCE TO RELATED APPLICATIONS

The disclosure of Japanese Patent Application No. 2010-116469 filed on May 20, 2010 including the specification, drawings and abstract is incorporated herein by reference in its entirety.

BACKGROUND

The present invention relates to an information processing device and a debugging technique for use therein, and relates to a technique that is effective for, e.g., microcomputers.

In respect to debugging of a computer system configured with multiple CPUs, a technique for ensuring exact synchronization in cooperative operation of breaks and step executions of the CPUs and observing temporal relations of output times of trace data obtained by tracing these CPUs is suggested in Patent Document 1. According to this technique, cooperation between or among the breaks of the CPUs is realized by hardware and exact synchronization of the breaks and step executions is accomplished. A cooperative debugging circuit is equipped with a combination circuit for break cooperation, a cooperative break control register, a cooperative break status register, a trace data storage unit, and an external device interface unit. The combination circuit for break cooperation combines break output signals from each CPU and generates a break input signal to the CPU. The trace data storage unit stores trace data obtained from the CPUs in association with trace data output time information.

A debugging device by which sequential order in time of occurrences of events recorded in a plurality of trace memories can be known irrespective of occurrence frequency by addition of fewer hardware elements is suggested in Patent Document 2. According to this device, when two sets of trace data obtained by tracing two CPUs are written into two respective trace memories, the temporal order of the occurrences of data stored in one trace memory and of data stored in the other trace memory is determined by writing into each trace memory a trace memory address of the other together with the trace data.

RELATED ART DOCUMENTS

Patent Documents

[Patent Document 1] Japanese Unexamined Patent Publication No. 2003-162426
[Patent Document 2] Japanese Unexamined Patent Publication No. 2003-076577

SUMMARY

Microcomputers which are regarded as an example of information processing devices are called microprocessors or data processors. Anon-chip debug method that enables debugging programs in such a microcomputer mounted over a substrate was initially adopted for microcomputers configured with a high-speed. CPU (Central Processing Unit) and SoC (System-on-a-chip) and now becomes a commonly used technique as a less costly debugging method for a lot of products. Recent high-end CPUs adopt superscalar and Harvard architectures in order to improve performance. By applying these techniques, an improvement in CPU performance, is expected. On the other hand, because of parallel operation of instruction execution and memory access, concurrent executions of multiple instructions, and others, operating analysis (debugging) of software embedded in LSI (Large Scale Integration) is becoming difficult.

Consequently, even if a computer system has only one CPU, it is important to keep track of the fact that instructions are executed in proper order and to know whether operand access occurring during an operation is performed at proper timing. Some customer systems may require a highly sophisticated analysis function in order to ensure safety, reliability, and accuracy and it is important to meet such requirement.

Even a system with one CPU encounters a problem as noted above. Still more, in the case of a multi-core system, it becomes more and more difficult to keep track of events occurring internally in the LSI, because all CPUs execute tasks assigned to them in a distributed and parallel processing manner. Multi-core system architectures with highly coupled CPUs, implemented by microcomputers, can generally be categorized into: one system (which is called "AMP system") in which memories and peripheral functions are shared and different OSs (Operating Systems) are installed for each of CPUs; and the other system (which is called "SMP system") in which only a single OS runs, thereby hiding the number of CPUs.

In an embedded field, the AMP system is commonly used in which processes and memory resources are statically allocated to each CPU even in a multi-core system to utilize existing software resources. Although the AMP system needs comparatively less modification to existing software, the following are newly required: checking for contention between multiple CPUs and testing for normal operation of interaction between pieces of software and exclusive processing. Even for the SMP system, a great burden is imposed on OS development in order to build a system configuration making CPUs transparent by a general-purpose OS and with the main aim of enhanced throughput. Exclusive control of resources, control of memory coherency, and control of queuing, which are operations that are rather transparent to end users, may result in a malfunction and an unintended deterioration in performance and thus are considered as main factors of increasing man-hours for software development.

Most of multi-core products which are now in widespread use are of SoC architecture in which blocks, each grouping a CPU and a set of function modules controlled by the CPU together, are coupled by an internal system bus. Thus, a debug function is basically designed to debug one CPU and a function for coupling to other blocks is added to it. In a configuration in which CPUs are thus loosely coupled, it is not effective to positively debug multiple CPUs simultaneously, because the function blocks are only integrated. Therefore, a debugging method on a per-CPU basis is easy to accept as a product specification. However, as for future multi-core products, there will be an increase of SMP system products making the number of CPUs transparent and products featuring enhanced realtime control and performance by processing different pieces of OS and software CPU by CPU discretely (AMP). In these products, the CPUs are tightly coupled and carry out parallel and distributed processing efficiently.

In parallel and distributed processing systems, a method of reacquiring trace data again and again, while switching to another CPU to be debugged, is hard to apply. This is because, in principle, malfunction reproducibility becomes scarce. Users are urged to need to run their system continuously as long as possible and extract a malfunction that occurs rarely. To address such a problem, a function of simultaneously debugging multiple CPUs may be an effective solution. In particular, if a function of simultaneously tracing multiple CPUs is feasible, it becomes possible to provide an advantageous technical support when selling products for high-reliability systems.

The above-mentioned function is also effective for decreasing power consumption which is a major goal of the multi-core engineering and for developing software relevant to decreasing power consumption. OS for SMP conducts distributed processing among multiple CPUs, but may make a CPU operate at a low speed or transit into a sleep state discretely, depending on the load condition of each CPU, thereby decreasing power consumption. When positively proceeding to decreasing power consumption, it becomes a problem how to keep track of the operating states of the CPUs operating in different conditions. It is still hard to say that means for knowing which operation mode into which a CPU transited, which timing when it transited, or whether it recovered normally from such mode are established. The reason why it is important to solve this problem is because it must be assured that memory coherency, exclusive control, synchronization control operate reliably, which is a problem of the multi-core engineering. For LSI for embedded OS/software controlled devices, it is indispensable to carry out cross debugging (validation on real hardware) in which an execution environment and a development environment differ, unlike PCs.

According to the technique discussed in the above Patent Document 1, no consideration is taken for a case where timing to tag a time stamp needs to be changed with respect to each of pipelining processes such as instruction execution, memory read, and memory write.

According to the technique discussed in the above Patent Document 2, considering pipelining operation and the like, it is hard to say that concurrent events are handled sufficiently well. Moreover, for instance, if any CPU only stops for a long period, the reliability of trace data obtained by tracing the CPU upon its restart to operate may potentially become impaired.

An object of the present invention is to provide a technique for facilitating software debugging by accurately obtaining instruction execution analysis data and memory access data from CPUs (Central Processing Units).

The above-noted and other objects and novel features of the present invention will become apparent from the following description in the present specification and the accompanying drawings.

A typical aspect of the invention disclosed in this application is summarized as follows.

An information processing device includes a central processing unit including an execution unit coupled to an operand bus and a control unit that controls operation of the execution unit, based on fetched instructions, and a debugging circuit that obtains trace data about how a program is executed in the central processing unit. The control unit includes a debugging function unit that collects instruction execution analysis data in the central processing unit. The debugging circuit includes a trace acquisition circuit that imports instruction execution analysis data collected by the debugging function unit and data received from the operand bus via logic circuits which are used for separate purposes and a trace output circuit for delivering outside the output of the trace acquisition circuit. The trace acquisition circuit includes a sorting logic unit that sorts instruction execution analysis data collected by the debugging function unit and data received from the operand bus in order of processing done by the central processing unit.

Effect obtained by a typical aspect of the invention disclosed in the present application is outlined below.

It is possible to facilitate software debugging by accurately obtaining instruction execution analysis data and memory access data from CPUs (Central Processing Units).

BRIEF DESCRIPTION OF THE DRAWINGS

FIG. 9 illustrates an example of a set of traces obtained by a debugging function unit in the microcomputer depicted in FIG. 1.

DETAILED DESCRIPTION

1. General Description of Embodiments

Figure 1:
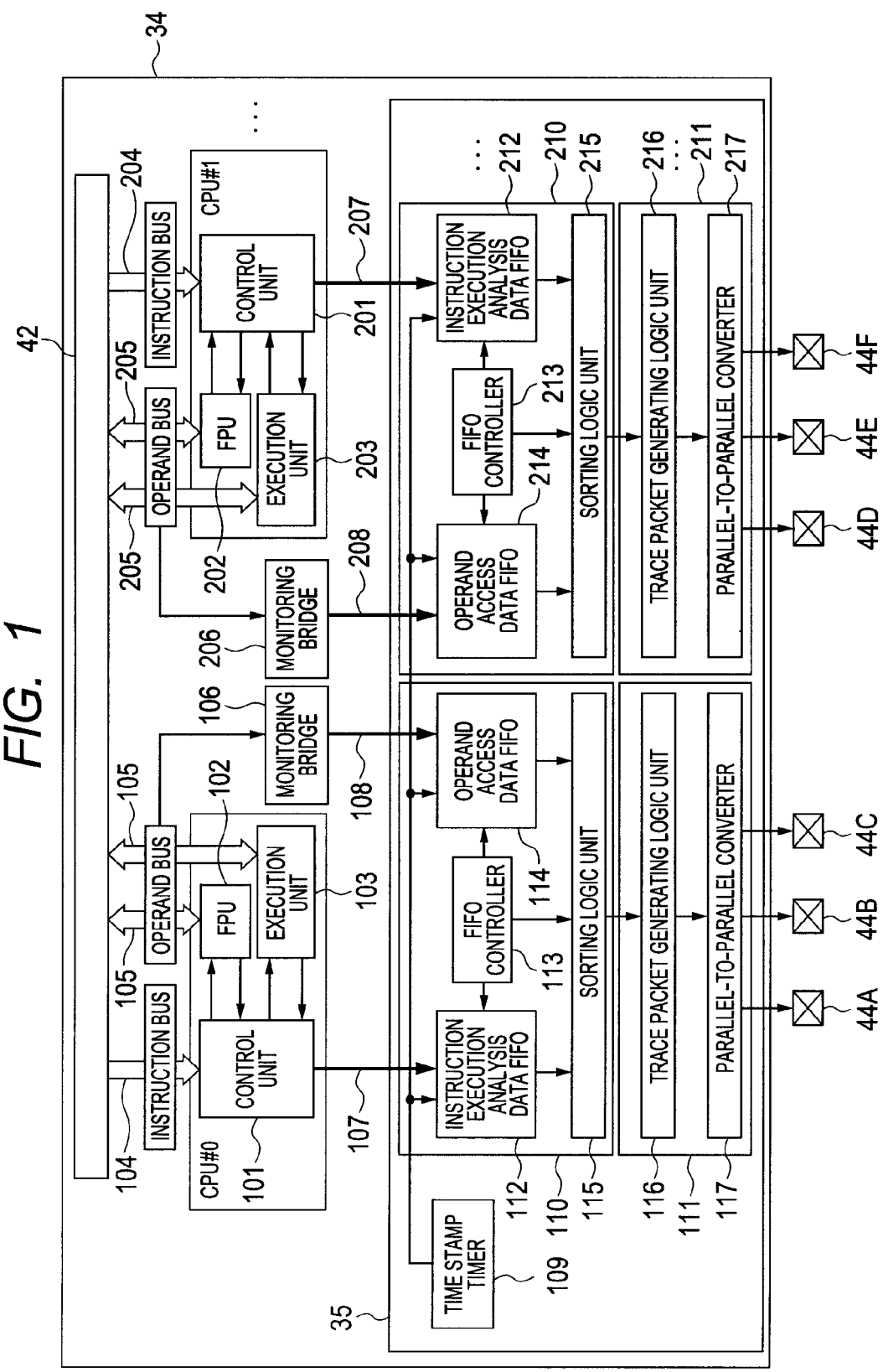
FIG. 1 is a block diagram depicting an example of a detailed structure of a main part of a microcomputer which is assumed as an example of an information processing device pertaining to the present invention.

To begin with, exemplary embodiments of the present invention disclosed herein are outlined. In the following general description of exemplary embodiments, reference designators in the drawings, which are given for referential purposes in parentheses, are only illustrative of elements that fall in the concepts of the components identified by the designators.

[1] An information processing device (34) pertaining to an exemplary embodiment of the present invention includes at least one central processing unit (CPU#0, CPU#1), each CPU including an execution unit (103, 203) coupled to an operand bus (103, 203) and a control unit (101, 201) that controls operation of the execution unit, based on fetched instructions, and a debugging circuit (35) that obtains trace data about how a program is executed in each CPU. The control unit includes a debugging function unit (508) that collects instruction execution analysis data in the CPU. The debugging circuit includes at least one trace acquisition circuit (110, 210) that imports instruction execution analysis data collected by the debugging function unit and data received from the operand bus via logic circuits (112, 114, 212, 214) which are used for separate purposes and at least one trace output circuit (111, 211) for delivering outside the output of the trace acquisition circuit. The trace acquisition circuit is configured including a sorting logic unit (115, 215) that sorts instruction execution analysis data collected by the debugging function unit and data received from the operand bus in order of processing done by the CPU.

According to the above-described configuration, trace acquisition circuits, for example, provided corresponding to CPUs are designed to import instruction execution analysis data collected by the debugging function unit within the control unit and operand access data received from the operand bus via the logic circuits which are used for separate purposes. Further, in each of the trace acquisition circuits, the sorting circuit sorts instruction execution analysis data collected by the debugging function unit and data received from the operand bus in order of processing done by the CPU. Thereby, even if instruction execution analysis data and operand access data come about at the same time, both the data can be traced accurately.

If it was arranged that instruction execution analysis data collected by the debugging function unit and operand access data received from the operand bus are imported via a common FIFO, there is a possibility that part of trace data is missing when a large amount of data is input to the FIFO. In contrast, the above trace acquisition circuits are designed to import instruction execution analysis data and operand access data via the logic circuits which are used for separate purposes. Thus, missing trace data becomes hard to occur.

Based on trace data collected as described above, trace results can easily be reproduced (displayed on a display unit) by a host system or the like.

[2] In the information processing device as set forth in [1], the above debugging circuit may be configured including, as the above logic circuits which are used for separate purposes, at least one first FIFO (112, 212) that takes in the instruction execution analysis data and at least one second FIFO (114, 214) that takes in the data received from the operand bus. A time stamp which is based on time information managed by a time stamp timer (109) shared within the debugging circuit is tagged to each individual unit of data which is taken in the first FIFO and to each individual unit of data which is taken in the second FIFO. These first FIFO and second FIFO can easily implement the functions of the above logic circuits used for separate purposes.

[3] In the information processing device as set forth in [2], the above sorting logic unit may be configured to sort data units output from the first FIFO and data units output from the second FIFO into a sequence of trace data in order of processing done by the CPU, based on time stamps tagged to the data units output from the first FIFO and time stamps tagged to the data units output from the second FIFO. This allows the host system or the like to reproduce trace results (display trace results on a display unit) easily.

[4] In the information processing device as set forth in [3], the CPU is configured to enable pipelining processing.

[5] In the information processing device as set forth in [4], the above sorting logic unit may determine an order of trace data units being after sorted, taking account of pipelining processing in the CPU, if a time stamp tagged to a data unit output from the first FIFO is identical to a time stamp tagged to a data unit output from the second FIFO. This allows the host system or the like to reproduce trace results (display trace results on a display unit) easily.

[6] In the information processing device as set forth in [5], the above sorting logic unit may discern a temporal inversion of trace times occurring between a data unit output from the first FIFO and a data unit output from the second FIFO due to pipelining processing in the CPU and determine an order of trace data units being after sorted.

[7] In the information processing device as set forth in [6], a plurality of CPUs are arranged and the above debugging circuit includes a plurality of trace acquisition circuits and a plurality of trace output circuits arranged to correspond to the CPUs. This allows the information processing device to operate as a multi-core system.

[8] In the information processing device as set forth in [7], the above CPU performs processing including a first step (1002) of fetching and decoding a branch instruction by the control unit and a second step (1003) of executing a branch process based on the branch instruction by the execution unit, accompanied by aborting decoding of subsequent instructions. The above processing further includes a third step (1004) of determining by the control unit whether or not pipelining processing can be stopped and a fourth step (1005) of fetching a branch destination instruction by the control unit, if pipelining processing can be stopped as determined at the third step. At the same time, the above trace acquisition circuit performs processing including the steps of initiating a branch trace (1006) in response to the first step and obtaining address of branch instruction and branch destination addresses and branch type information (1007) of branch destination in response to the second step. Thereby, branch instruction execution trace data can be obtained.

[9] In the information processing device as set forth in [8], the above CPU performs processing including a fifth step (1102) of fetching and decoding a sleep instruction by the control unit and a sixth step (1103) of executing the sleep instruction by the execution unit based on a result of the decoding at the fifth step. The above processing further includes a seventh step (1104) of determining by the control unit whether or not pipelining processing can be stopped and an eighth step (1105) of transiting into a low power consumption state, if pipelining processing can be stopped as determined at the seventh step. The above trace acquisition circuit performs processing including the steps of initiating a sleep trace in response to the fifth step and obtaining the instruction address in response to the sixth step. Thereby, sleep instruction execution trace data can be obtained.

[10] In the information processing device as set forth in [7], a logic circuit (219) for merging and delivering outside the outputs of the trace output circuits via common terminals (44A, 44B, 44C) may be provided. Thereby, the number of the common terminals can be reduced.

2. Details on Embodiments

Embodiments of the invention will now be described in greater detail.

First Embodiment

Figure 3:
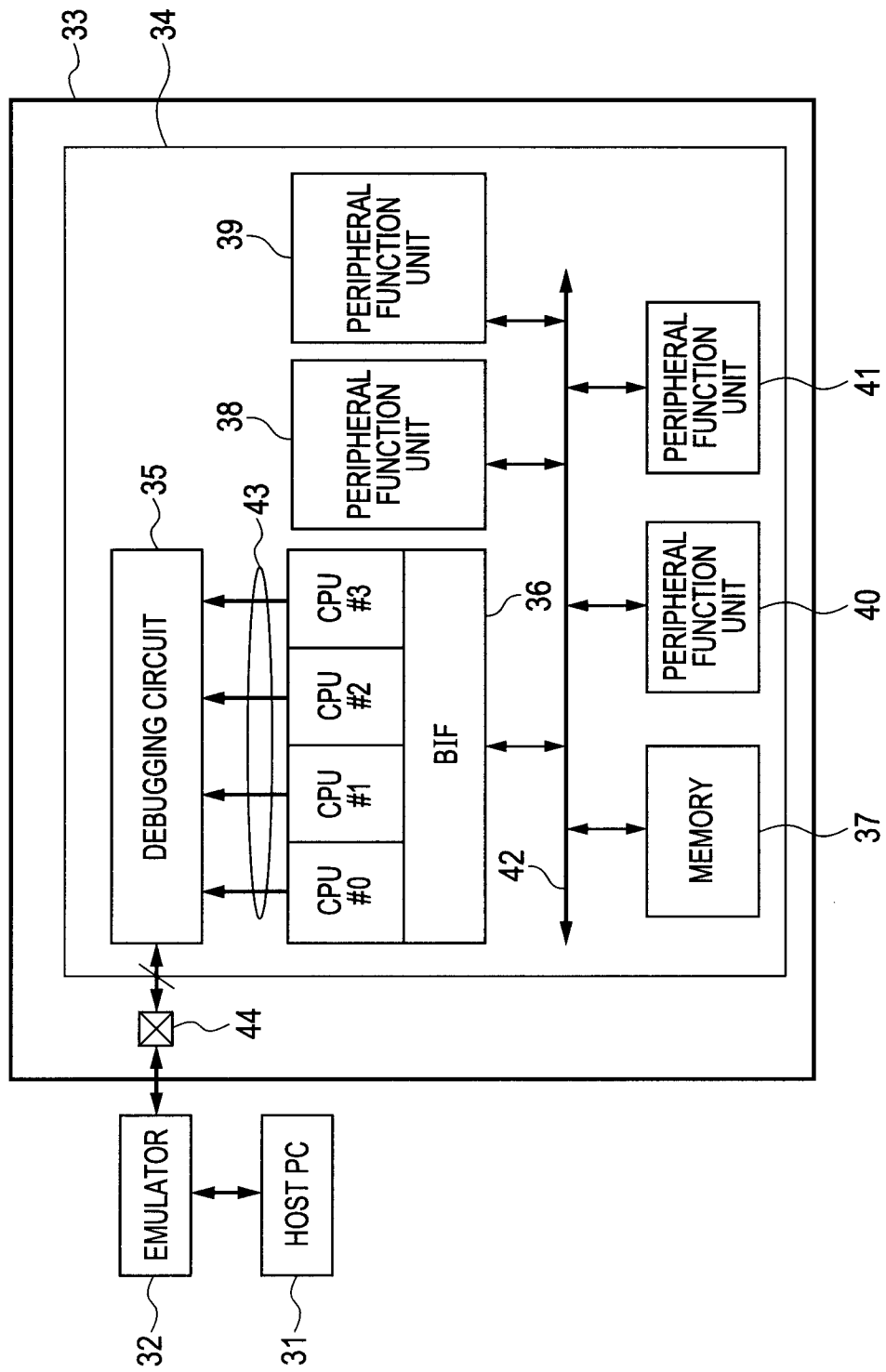
FIG. 3 is a block diagram depicting an example of an overall structure of the microcomputer depicted in FIG. 1.

FIG. 3 depicts a microcomputer which is assumed as an example of an information processing device pertaining to the present invention.

The microcomputer 34 depicted in FIG. 3 is assumed to be an SMP system. The microcomputer 34 includes, but not limited to, a debugging circuit 35, four CPUs #0 to #3, a bus interface (BIF) 36, a memory 37, and peripheral function units 38 to 41. Although not restrictive, the microcomputer 34 is formed over a single semiconductor substrate such as a monocrystalline silicon substrate by a publicly known semiconductor integrated circuit manufacturing technology. Processes are allocated to the CPUs #0 to #3 symmetrically and evenly, so that parallel processing can be performed by these multiple CPUs. The CPUs #0 to #3 are assumed to have compositions which are identical each other and coupled to the debugging circuit 35 via dedicated interfaces (dedicated buses) 43. Via the dedicated interfaces 43, instruction execution analysis data (107, 207) and operand access data (108, 208) are output to the debugging circuit 35. The CPUs #0 to #3 are also coupled to a system bus 42 via the bus interface 36. To this system bus 42, the memory 37 and the peripheral function units 38 to 41 are coupled. The memory 37 encompasses a flash memory in which programs to be executed by the CPUs #0 to #3 are stored and an SRAM (Static Random Access Memory) or DRAM (Dynamic Random Access Memory) which is randomly accessible to the CPUs #0 to #3. The peripheral function units 38 to 41 encompass an analog-digital converter for converting input analog signals to digital signals and various types of interfaces enabling serial communication with external devices. The microcomputer 34 is mounted on a user system board 33. The user system board 33 is equipped with one or more terminals 44 for debugging. The debugging circuit 35 is coupled to an emulator 32 via a terminal for debugging 44 in order to enable on-chip debugging of the microcomputer 34. The emulator 32 collects debug data through the debugging circuit 35 under control of a host system 31.

Figure 4:
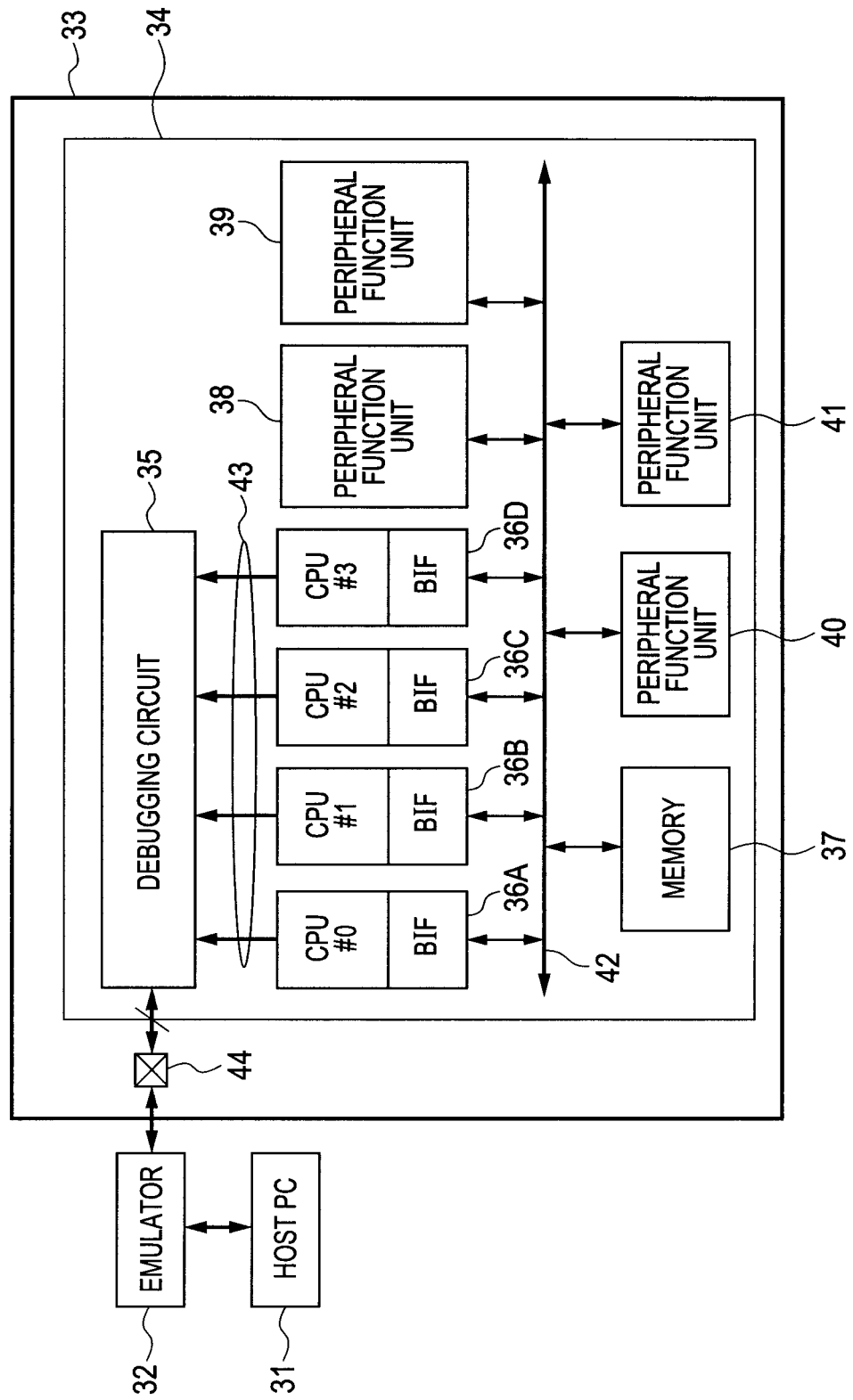
FIG. 4 is a block diagram depicting another example of an overall structure of the microcomputer depicted in FIG. 1.

FIG. 4 depicts a microcomputer according to an AMP system. A significant difference of the microcomputer depicted in FIG. 4 from the microcomputer depicted in FIG. 3 lies in that the CPUs #0 to #3 are coupled to the system bus via their dedicated bus interfaces 36A, 36B, 36C, 36D.

FIG. 1 depicts an example of a detailed structure of a main part of the microcomputer depicted in FIG. 3 or FIG. 4.

A CPU #0 includes a control unit 101, an FPU (Floating Point number processing Unit) 102, and an execution unit 103. The control unit 101 is coupled to the system bus 42 via an instruction bus 104. The control unit 101 fetches an instruction through the instruction bus 104 and, by decoding it, produces an operation control signal for the FPU 102 and the execution unit 103. The control unit 101 also outputs instruction execution analysis data 107. The instruction execution analysis data 107 includes, but not limited to, branch information, instruction decoding information, and information about the count of executed instructions. The instruction execution analysis data 107 is transferred to the debugging circuit 35. The FPU 102 is specialized to carry out floating-point operations under control of the control unit 101. The execution unit 103 carries out integer arithmetic processing under control of the control unit 101. The FPU 102 and the execution unit 103 are coupled to the system bus 42 via operand buses 105. Values and variables which are the objects that are manipulated by arithmetic operation of the FPU 102 and the execution unit 103 are termed operands. The operands are transferred from, e.g., the memory 37 to the FPU 102 and the execution unit 103 via the operand buses 105. The states of the operand buses 105 (which are referred to as "operand access data 108") are transferred to the debugging circuit 35 via a monitoring bridge 106.

A CPU #1 is configured in the same way as the CPU #0 and includes a control unit 201, FPU 202, and execution unit 203. The control unit 201 is coupled to the system bus 42 via an instruction bus 204. The control unit 201 fetches an instruction through the instruction bus 204 and, by decoding it, produces an operation control signal for the FPU 202 and the execution unit 203. The control unit 201 also outputs instruction execution analysis data 207. The instruction execution analysis data 207 includes, but not limited to, branch information, instruction decoding information, and information about the count of executed instructions. The instruction execution analysis data 207 is transferred to the debugging circuit 35. The FPU 202 is specialized to carry out floating-point operations under control of the control unit 201. The execution unit 203 carries out integer arithmetic processing under control of the control unit 201. The FPU 202 and the execution unit 203 are coupled to the system bus 42 via operand buses 205. Values and variables (operands) which are the objects that are manipulated by arithmetic operation of the FPU 202 and the execution unit 203 are transferred from, e.g., the memory 37 to the FPU 202 and the execution unit 203 via the operand buses 205. The states of the operand buses 105 (which are referred to as "operand access data 208") are transferred to the debugging circuit 35 via a monitoring bridge 206.

The debugging circuit 35 is configured as follows.

The debugging circuit 35 includes, but not limited to, a time stamp timer 109, trace acquisition circuits (TRCs) 110, 210, and trace output circuits (AUDs) 111, 211. A trace acquisition circuit 110 and a trace output circuit 111 are provided so as to correspond to the CPU #0 and a trace acquisition circuit 210 and a trace output circuit 211 are provided so as to correspond to the CPU #1.

The trace acquisition circuit 110 includes an instruction execution analysis data FIFO (First-In First-Out) 112, a FIFO controller 113, an operand access data FIFO 114, and a sorting logic unit 115. The instruction execution analysis data FIFO 112 is provided as a special-purpose buffer memory for taking in instruction execution analysis data 107 which has been output from the control unit 101 within the CPU #0. The instruction execution analysis data taken in this instruction execution analysis data FIFO 112 is to be output to the subsequent sorting logic unit 115 in ascending order by time.

The operand access data FIFO 114 is provided as a special-purpose buffer memory for taking in operand access data 108 which has been transferred via the monitoring bridge 106. The operand access data 108 taken in this operand access data FIFO 114 is to be output to the subsequent sorting logic unit 115 in ascending order by time.

A time stamp which is based on time information managed by the time stamp timer 109 shared within the debugging circuit 35 is tagged to each individual unit of instruction execution analysis data 107 which is taken in the instruction execution analysis data FIFO 112 and to each individual unit of operand access data 108 which is taken in the operand access data FIFO 114.

The sorting logic unit 115 has a function of sorting data units output from the instruction execution analysis data FIFO 112 and data units output from the operand access data FIFO 114 into a sequence of trace data in order of processing done by the CPU #0.

The FIFO controller 113 controls the operations of the instruction execution analysis data FIFO 112, the operand access data FIFO 114, and the sorting logic unit 115.

The trace output circuit 111 includes a trace packet generating logic unit 116 and a parallel-to-parallel converter 117. The trace packet generating logic unit 116 produces packet data by adding necessary information to output data from the sorting logic unit 115. It also performs processing for obtaining a value of address data difference in order to reduce the size of packet data. By composing a data packet with only a necessary and sufficient amount of data required by the host system 31, the time taken to output one packet data is curtailed. The parallel-to-parallel converter 117 converts parallel data which has been output from the trace packet generating logic unit 116 into parallel data with a smaller size by a time division manner. Converted data is then output to the emulator 32 via terminals for debugging 44A, 44B, 44C.

The trace acquisition circuit 210 includes an instruction execution analysis data FIFO 212, a FIFO CONTROLLER 213, an operand access data FIFO 214, and a sorting logic unit 215. The instruction execution analysis data FIFO 212 is provided as a special-purpose buffer memory for taking in instruction execution analysis data 207 which has been output from the control unit 201 within the CPU #1. The instruction execution analysis data taken in this instruction execution analysis data FIFO 212 is to be output to the subsequent sorting logic unit 215 in ascending order by time.

The operand access data FIFO 214 is provided as a special-purpose buffer memory for taking in operand access data 208 which has been transferred via the monitoring bridge 206. The operand access data 208 taken in this operand access data FIFO 214 is to be output to the subsequent sorting logic unit 215 in ascending order by time.

A time stamp which is based on time information managed by the time stamp timer 109 shared within the debugging circuit 35 is tagged to each individual unit of instruction execution analysis data 207 which is taken in the instruction execution analysis data FIFO 212 and to each individual unit of operand access data 208 which is taken in the operand access data FIFO 214.

The sorting logic unit 215 has a function of sorting output data from the instruction execution analysis data FIFO 212 and output data from the operand access data FIFO 214 into a sequence of trace data in order of processing done by the CPU #1.

The FIFO controller 213 controls the operations of the instruction execution analysis data FIFO 212, the operand access data FIFO 214, and the sorting logic unit 215.

The trace output circuit 111 includes a trace packet generating logic unit 216 and a parallel-to-parallel converter 217. The trace packet generating logic unit 216 produces packet data by adding necessary information to output data from the sorting logic unit 215. It also performs processing for obtaining a value of address data difference in order to reduce the size of packet data. By composing a data packet with only a necessary and sufficient amount of data required by the host system 31, the time taken to output one packet data is curtailed. The parallel-to-parallel converter 217 converts parallel data which has been output from the trace packet generating logic unit 216 into parallel data with a smaller size by a time division manner. Converted data is then output to the emulator 32 via multiple terminals for debugging 44D, 44E, 44F.

Figure 5:
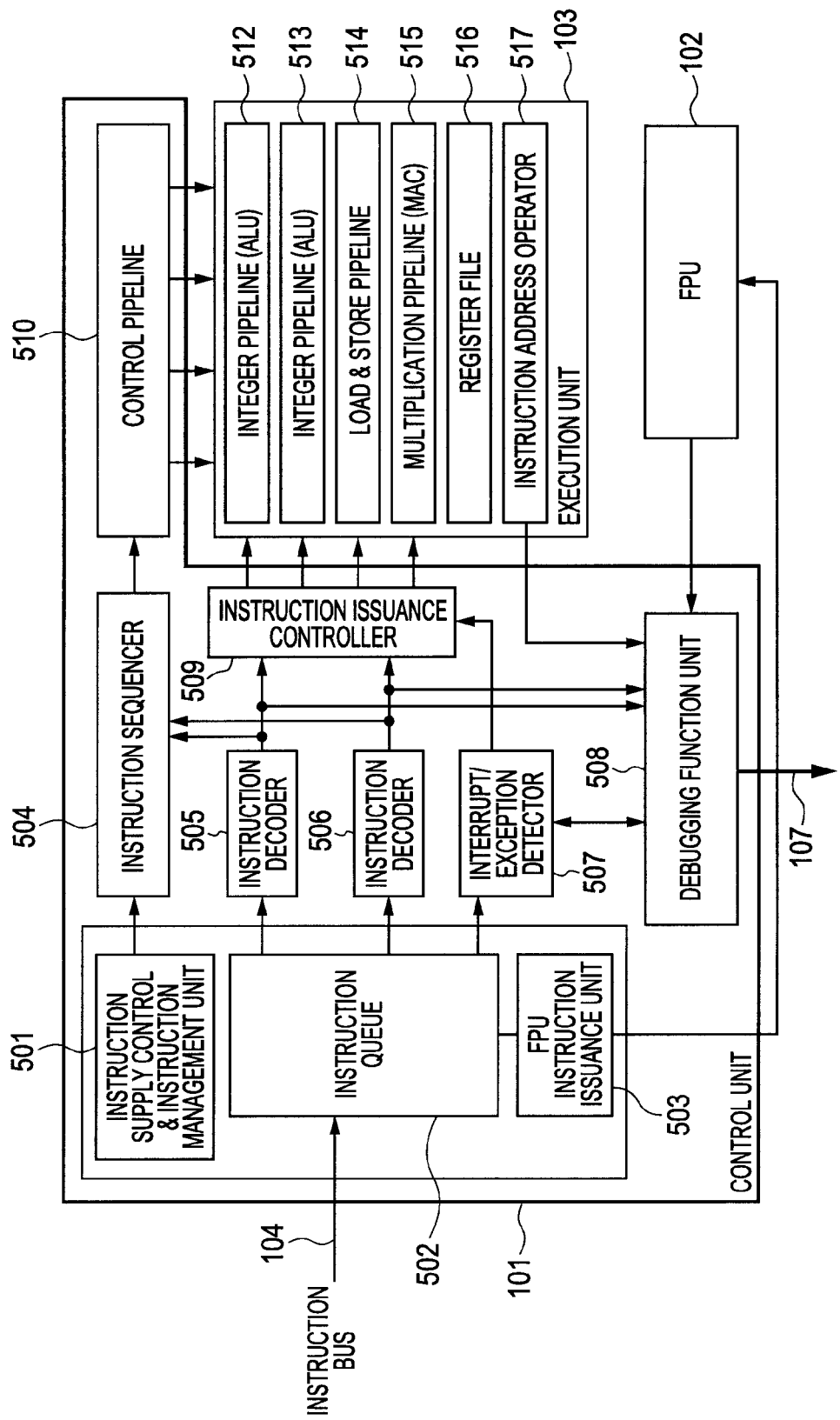
FIG. 5 is a block diagram depicting an example of a structure of the main part of the microcomputer depicted in FIG. 1.

FIG. 5 depicts an example of a structure of the control unit 101 and the execution unit 103 in the CPU #0.

The execution unit 103 includes four pipelines, a register file 516, and an instruction address operator 517. The four pipelines include integer pipelines (ALUs) 512, 513, a load and store pipeline 514, and a multiplication pipeline (MAC) 515. The register file 516 encompasses a general-purpose register, a control register, a system register, etc.

Although not restrictive, the control unit 101 and the execution unit 103 are adapted to operate in an arrangement (superscalar) allowing multiple instructions to be processed in parallel by being provided with multiple processing paths (pipelines). The control unit 101 includes an instruction supply control and instruction management unit 501, an instruction queue 502, an FPU instruction issuance unit 503, an instruction sequencer 504, instruction decoders 505, 506, an interrupt/exception detector 507, a debugging function unit 508, an instruction issuance controller 509, and a control pipeline 510. The instruction queue 502 fetches an instruction from the memory 37 via the instruction bus 104. The instruction queue 502 also performs pre-reading of an instruction. An instruction fetched by the instruction queue 502 is transferred to the instruction decoders 505, 506 or the interrupt/exception detector 507. The instruction decoders 505, 506 decodes an instruction input thereto. A result of the decoding is transferred to the instruction issuance controller 509. The interrupt/exception detector 507 performs accepting an interrupt or detecting an instruction execution result exception. The FPU instruction issuance unit 503 issues an instruction to the FPU 102. The instruction issuance controller 509 controls issuance of a control signal to each of the components of the execution unit 103. The instruction supply control and instruction management unit 501 performs instruction supply control and instruction address management. The instruction sequencer 504 carries forward each step of a pipeline serially in accordance with a predefined sequence or procedure. The control pipeline 510 controls pipelining processing in the execution unit 103 under control of the instruction sequencer 504. The debugging function unit 508 collects a variety of data from the components of the CPU #0, e.g., the instruction decoders 505, 506, the interrupt/exception detector 507, the execution unit 103, the FPU 102, etc. and outputs that data as instruction execution state analysis data 107 to the instruction execution analysis data FIFO 112. For example, what type of branch occurred (branch information) can be obtained from the instruction decoders 505, 506 and what type of instruction executed (instruction decoding information) can be obtained from the instruction decoders 505, 506 and the interrupt/exception detector 507. Information as to whether two instructions or a single instruction was executed (information about the count of executed instructions) can be obtained from the instruction supply control and instruction management unit 501, instruction decoders 505, 506, and control pipeline 510. A value of address of branch instruction can be obtained from the instruction address operator 517. A branch destination address value can be obtained from the interrupt/exception detector 507, instruction sequencer 504, control pipeline 510, and instruction address operator 517. Information about a debugging dedicated instruction, instruction exception, interrupt, and exception handling can be obtained from the interrupt/exception detector 507. Information related to read or write and data size accessed (bus access information) can be obtained from the instruction decoders 505, 506. Information related to read from or write to an FPU register and data size accessed (FPU access information) can be obtained from the FPU instruction issuance unit 503 and FPU 102.

The control unit 201 and the execution unit 203 in the CPU #1 are, respectively, configured in the same way as the control unit 101 and the execution unit 103 in the CPU #0.

Then, descriptions are provided for debugging the microcomputer 34 configured as described above.

Figure 6:
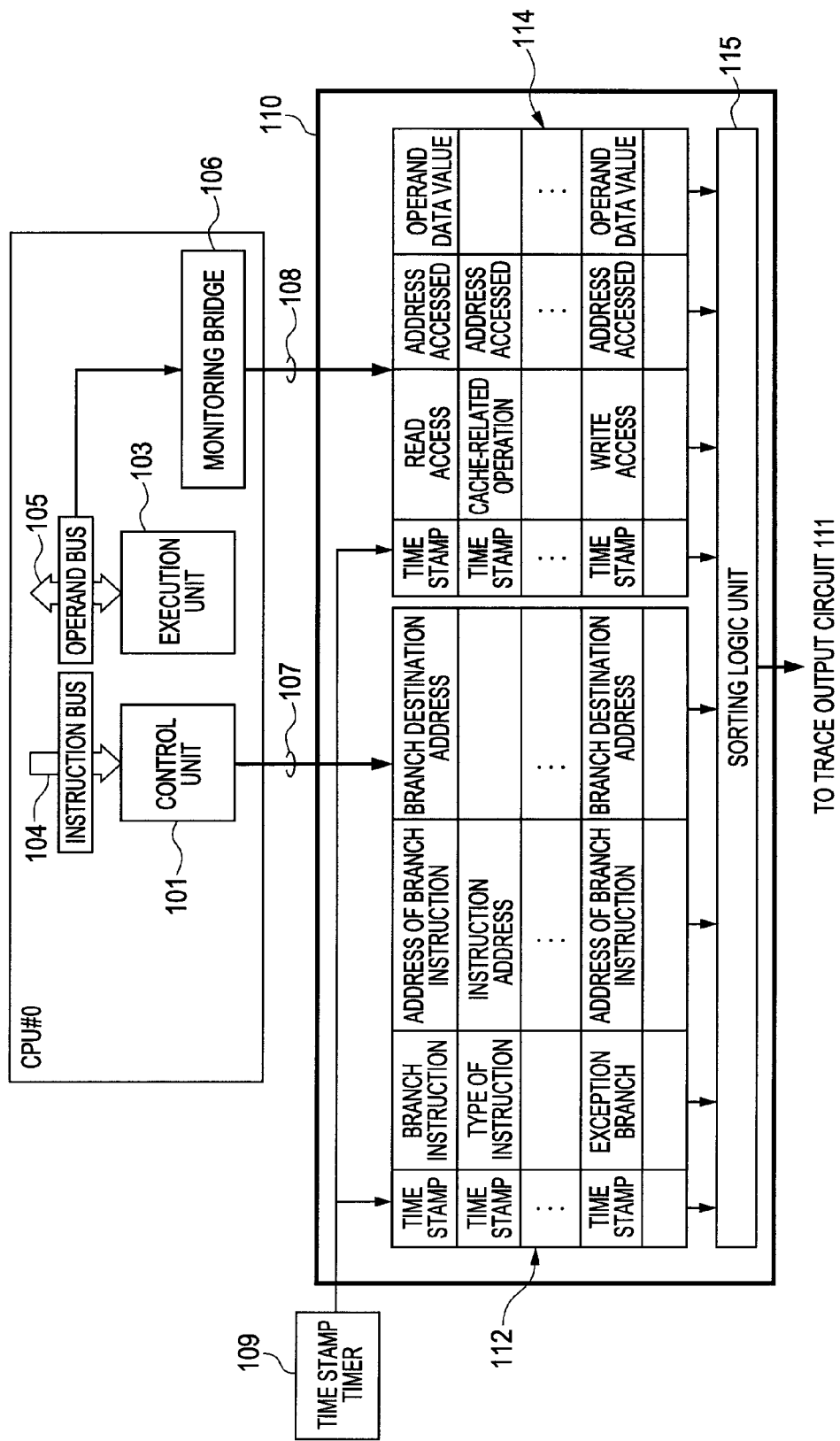
FIG. 6 is an illustrative diagram for explaining the main part of the microcomputer depicted in FIG. 1.

FIG. 6 schematically illustrates how data is stored in the instruction execution analysis FIFO 112 and the operand access data FIFO 114 shown in FIG. 1. The trace acquisition circuit 110 corresponding to the CPU #0 is designed to import instruction execution analysis data 107 collected by the debugging function unit 508 within the control unit 101 and operand access data 108 received from the operand bus 105 via the logic circuits which are used for separate purposes, namely, the instruction execution analysis data FIFO 112 and the operand access data FIFO 114. By configuring the trace acquisition circuit in this way, it is possible to obtain plural units of trace data (instruction execution analysis data 107 and operand access data 108) that may come about from the CPU. A time stamp is tagged to each unit of trace data, thus making it easy to keep track of sequential order in data acquisition time. However, because software to be debugged serially executes instructions one by one, it is needed to combine branch traces and operand traces into one set of trace data in order corresponding to the order of the instructions.

Because instructions are executed by the CPU in a pipelining manner, especially, operand access is completed at random timing after the execution of an instruction. For this reason, trace data is output to the trace output circuit 111 (211) after being manipulated by the sorting logic unit 115 (215), as will be described below.

(A) Order in which data is retrieved from the instruction execution analysis FIFO 112 (212) and the operand access data FIFO 114 (214) is determined based on sequential order in time using time stamp information.

(B) Order of trace data units occurred at the same time is determined, taking pipelining rules into account.

(c) In a case that, due to pipelining processing, a temporal inversion occurs between a time when one trace was obtained and a time when another trace was obtained, these traces are reordered in proper order.

When the sorting logic unit 115 (215) manipulates trace data, data acquisition rules are set, taking account of the characteristics of different traces which will be described below.

In a branch trace method, an instruction address from which a branch originates and an instruction address of branch destination are needed. Only after these two pieces of information are obtained, branch trace data is fixed.

When an operand access is traced, two ways of usage are required. That is, in one case, an access result is traced. In another case, it is sufficient that an access request is able to be traced. In the former case, trace data is not fixed until the relevant operand can be obtained. In the latter case, once the access has been initiated, it is traceable. There is also a difference between the former and the latter with regard to whether or not concurrent occurrence of two or more events traced and pipelining must be taken into account. Moreover, as for operand access, the number of steps required before completing the access differ between read and write.

A period after a read request, information about data size accessed, and an address are output, until the data is obtained from the accessed address, is a required access period.

On the other hand, after a write request, information about data size accessed, and an address are output, the access can be completed upon the output of data to be written. In design, it is also possible to output data to be written together with an address. In that case, a process of tracing a write access terminates in a shorter period than tracing a read access.

A sequence of trace data flow is composed taking account of the above characteristics of different traces. That is, with the knowledge of the difference between the characteristics of branch traces and those of operand traces and the difference between the characteristics of read access and those of write access, a single sequence of trace output is obtained based on the outputs of the instruction execution analysis data FIFO 112 (212) and the operand access data FIFO 114 (214). In this sequence of trace output, units of trace data are arranged in order in which they occurred, that is, in order of processing done by the CPU.

Figure 7:
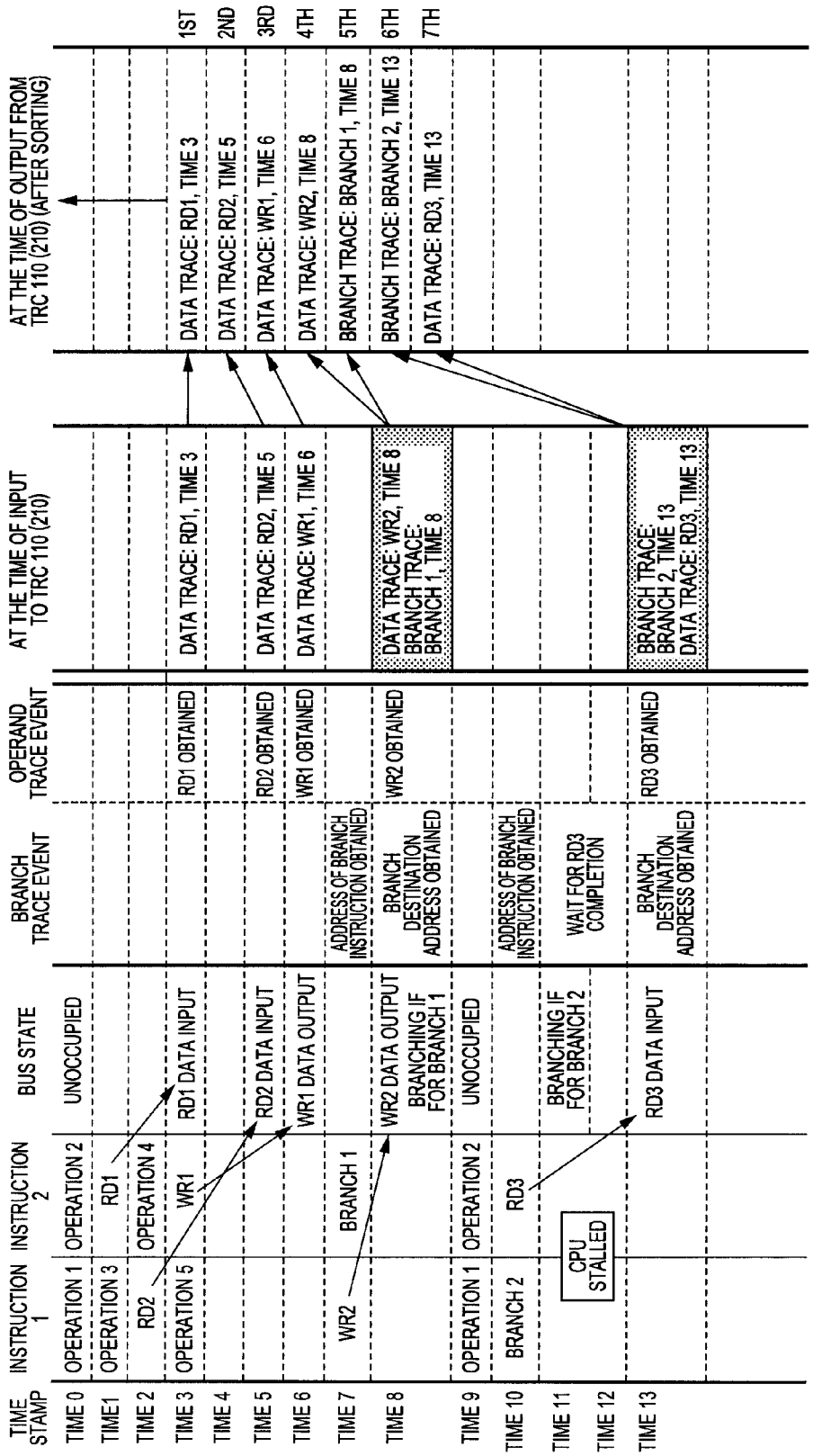
FIG. 7 illustrates an example of a set of traces obtained in the superscalar architecture in the microcomputer depicted in FIG. 1.

FIG. 7 illustrates an example of a set of traces obtained in the superscalar architecture.

"RD" denotes a read instruction and "WR" denotes a write instruction and it is presumed that a branch instruction and a data access can be executed concurrently. In this example, it is assumed that a read value and a write value are traced from the bus and the trace output circuit (AUD) 111, 211 cannot output a plurality of events.

For instance, at time 1, an operation 3 is executed as instruction 1 and a read instruction RD1 is executed as instruction 2 concurrently. At time 3, a read access by RD1 is traced and obtained data is input as a result of tracing the RD1 to the trace acquisition circuit 110 (210). In this case, the result of tracing the RD1 is output as is from trace acquisition circuit 110 (210). At time 2, a read instruction RD2 is executed as instruction 1 and an operation 4 is executed as instruction 2 concurrently. At time 5, a read access by RD2 is traced and a result of the tracing is input to the trace acquisition circuit 110 (210). In this case, the result of tracing the RD2 is output as is from the trace acquisition circuit 110 (210). At time 3, an operation 5 is executed as instruction 1 and a write instruction WR1 is executed as instruction 2 concurrently. At time 6, a write access by WR1 is traced and a result of the tracing is output from the trace acquisition circuit 110 (210). At time 7, a write instruction WR2 is executed as instruction 1 and a branch instruction 1 is executed as instruction 2 concurrently. Because, in the branch trace method, an instruction address from which a branch originates and an instruction address of branch destination are needed, the "WR2" data trace and the "branch 1" branch trace are obtained at the same time 8. Thus, the sorting logic unit 115 (215) manipulates these two units of trace data having the same time stamp so that they are put in order, taking the pipelining rules into account. That is, the sorting logic unit 115 (215) outputs "data trace: WR2, time 8" first, followed by "branch trace: branch 1, time 8". Then, at time 10, a branch 2 is executed as instruction 1 and a read instruction RD3 is executed as instruction 2. In this case, the branch 2 is assumed to be a delayed branch instruction and the CPU is stalled until the execution of RD3 terminates. As a result, the "branch 2" branch trace and the "RD3" data trace are obtained at the same time 13. In this case, the sorting logic unit 115 (215) manipulates these two units of trace data having the same time stamp so that they are put in order, taking the pipelining rules into account. That is, "branch trace: branch 2, time 13" is output first and followed by "data trace: RD3, time 13".

Figure 8:
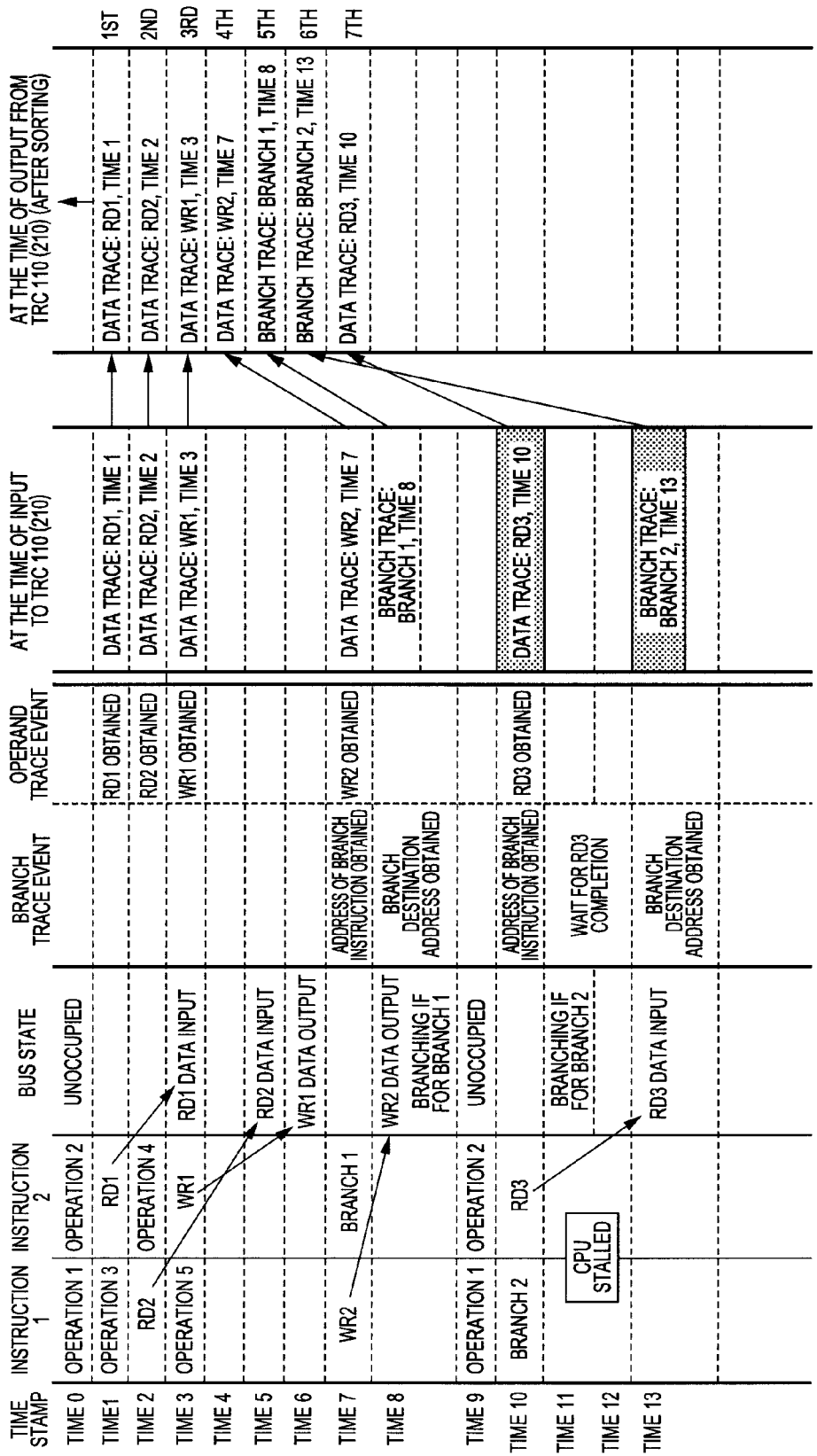
FIG. 8 illustrates another example of a set of traces obtained in the superscalar architecture in the microcomputer depicted in FIG. 1.

FIG. 8 illustrates another example of a set of traces obtained in the superscalar architecture.

"RD" denotes a read instruction and "WR" denotes a write instruction and it is presumed that a branch instruction and a data access can be executed concurrently. In this example, it is assumed that a read value and a write value are not traced and the trace output circuit (AUD) 111, 211 cannot output a plurality of events. Under this condition, when a branch 2 is execute as instruction 1 and a read instruction RD3 is executed as instruction 2 concurrently at time 10, a trace of a read access by RD3 is obtained at time 10. As a result, a temporal inversion occurs between the time of the data trace and the time of the branch trace. Thus, the sorting logic unit 115 (215) manipulates and reorders these two trace in proper order in the case that a temporal inversion occurs between the trace times due to pipelining processing. That is, "branch trace: branch 2, time 13" is output first, followed by "data trace: RD3, time 10".

By providing such trace results as illustrated above to the external emulator 32, according to the previously described rules, it will become easy for the emulator 32 and the host system 31 to reproduce the trace results (display the trace results on a display unit). This can contribute to an improvement in the performance of the entire debugging system. Considering a multi-core system, separate units of trace data obtained by tracing different CPUs may be output from the same terminal. To determine sequential order in time between the traces of the different CPUs, it is possible to define time stamps when the traces were obtained and reproducing trace results will become easy.

Second Embodiment

A merit of multi-core systems lies in that the CPU clocks for the respective CPUs can be altered dynamically. However, if there are the CPUs operating at different frequencies, such situation may potentially give rise to the following disadvantages.

Specifically, (A) because of different instruction execution speeds, it becomes hard to keep track of the amount of executed instructions only by tracing. (B) It becomes unknown which CPU transited into a state where the operating frequency is zero (so-called sleep state) and when it transited into that state.

A possible solution to the above disadvantage (A) is counting executed instructions according to an instruction execution count issued by the control unit 101 (201). A possible solution to the above disadvantage (B) is detecting the execution of a SLEEP instruction by the debugging function unit 508 within the control unit 101 (201).

Furthermore, by the debugging function unit 508 within the control unit 101 (201), the following information can be obtained.

State change of a CPU and a result of execution of a CPU-specific instruction are considered as information that is effective for debugging. It will be expedient to obtain additionally the execution states of distinctive instructions such as SLEEP instruction, LDS/STS instruction, LDC/STC instruction, debugging dedicated instruction, TRAP instruction, floating point instruction, cache control instruction, exclusive control instruction. The debugging efficiency can further be improved by providing a function of tracing an event that alters the operation of a CPU, which is, however, not an instruction, a result of execution of a specific instruction; for example, exception handling, manual reset exception, etc. resulting from the execution of an instruction.

FIG. 9 illustrates an example of a set of traces obtained by the debugging function unit 508.

Trace types may include branch trace packet composition, data trace packet composition, SLEEP instruction trace, cache-related operation instruction trace, LDS/STS instruction trace, LDC/STC instruction trace, debugging dedicated instruction trace, etc. Components of a trace data packet that is output from the trace output circuit (AUD) 111, 211 may include CPU No. traced (CPU information), branch type (cause of branch information), packet composition information, branch destination address, address of branch instruction, time stamp, and the count of instructions executed after the last branch. For the purpose of tracing the execution of an instruction, at least three pieces of information, namely, CPU information, instruction type, and time stamp, if obtained, form a meaningful unit of trace data. According to the branch trace packet composition, it is possible to keep track of a branch by a branch instruction, a CPU exception detected, and a branch of a program by an interrupt or exception handling. According to the data trace packet composition, it is possible to keep track of data read from or written into a memory or I/O register by a data transfer instruction. According to the SLEEP instruction trace, it is possible to keep track of the fact that the CPU transited into a low power consumption state by executing a SLEEP instruction. According to the cache-related operation instruction trace, it is possible to keep track of the execution and the relevant address of a prefetch instruction for an instruction or data, a cache line invalidation instruction, etc. According to the LDC/STC instruction trace, it is possible to keep track of the fact that the CPU and FPU states changed by executing an instruction loaded or stored into a control register of the CPU. According to the LDS/STS instruction trace, it is possible to keep track of the fact that the CPU and FPU states changed by executing an instruction loaded or stored into a system register of the CPU and FPU. According to the debugging dedicated instruction trace, it is possible to keep track of the fact that the CPU operating state changed, as a CPU stop (break) or the like occurred due to the debugging dedicated instruction.

Figure 10:
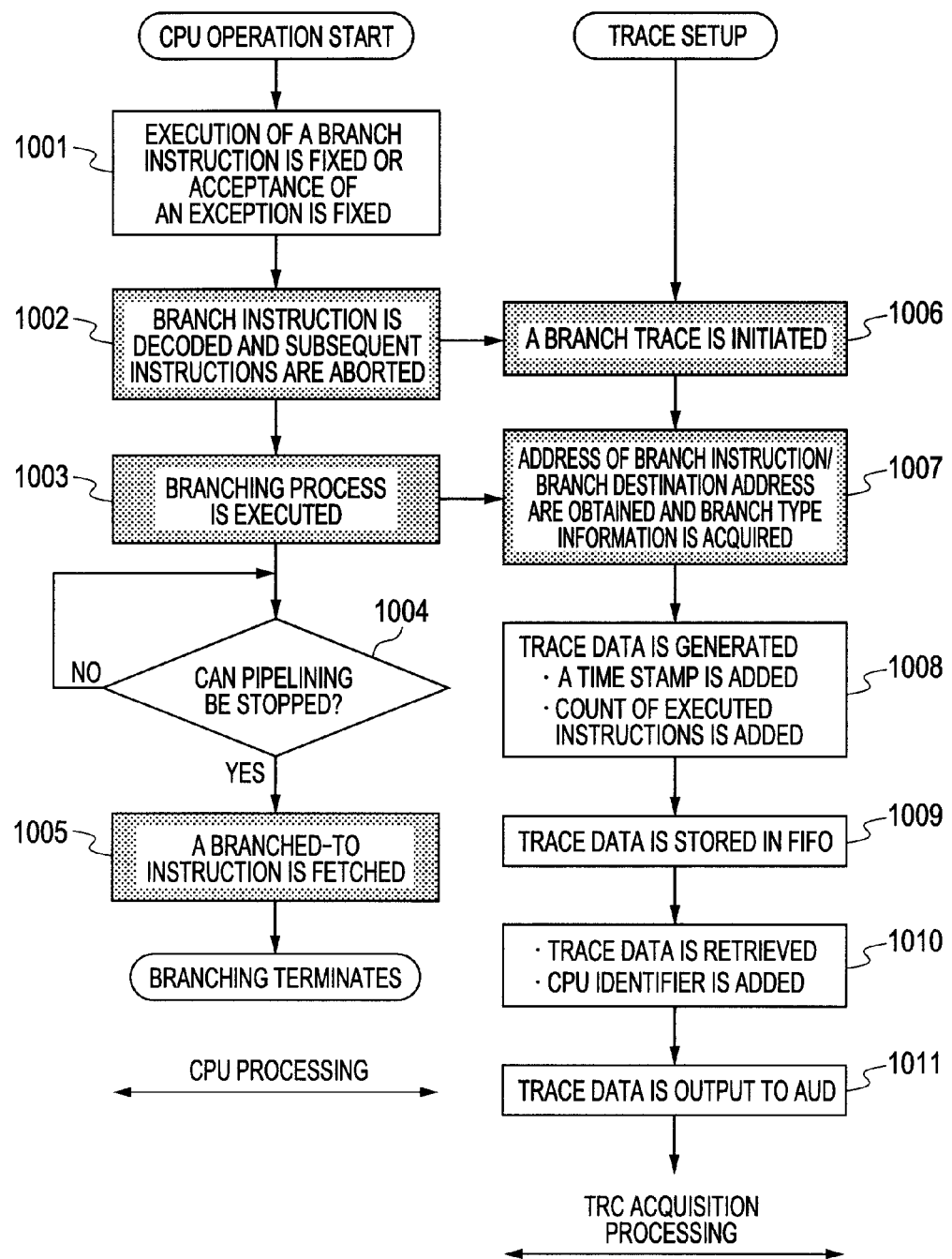
FIG. 10 is a flowchart illustrating the flow of a branch trace in the microcomputer depicted in FIG. 1.

FIG. 10 illustrates the flow of a branch trace.

First, when the execution of a branch instruction execution is fixed or the acceptance of an exception is fixed (1001), the branch instruction is decoded, but decoding subsequent instructions is aborted (1002). In the case of exception handling, no instruction is decoded, but decoding subsequent instructions is aborted likewise (1002). Then, the branch process is executed (1003) and the control unit 101 (201) determines whether or not pipelining processing can be stopped (1004). If pipelining processing can be stopped, a branch destination instruction is fetched (1005). The above steps 1011 to 1005 are performed as CPU processing. Meanwhile, in the debugging function unit 508, a branch trace is initiated (1006) at the same time when decoding the branch instruction begins in the above step 1002. Address of branch instruction/branch destination address and branch type are obtained by the debugging function unit 508 (1007). Then, in the trace acquisition circuit (TRC) 110 (210), trace data is generated (1008) by adding a time stamp and the count of executed instructions and then stored in the instruction execution analysis data FIFO 112 (212) (1009). Subsequently, the stored trace data is retrieved from the instruction execution analysis data FIFO 112 (212) and the CPU identifier is added (1010). Then, the trace data is output to the trace output unit 111 (212) (1011). The above steps 1006 to 1011 are performed as TRC acquisition processing.

Figure 11:
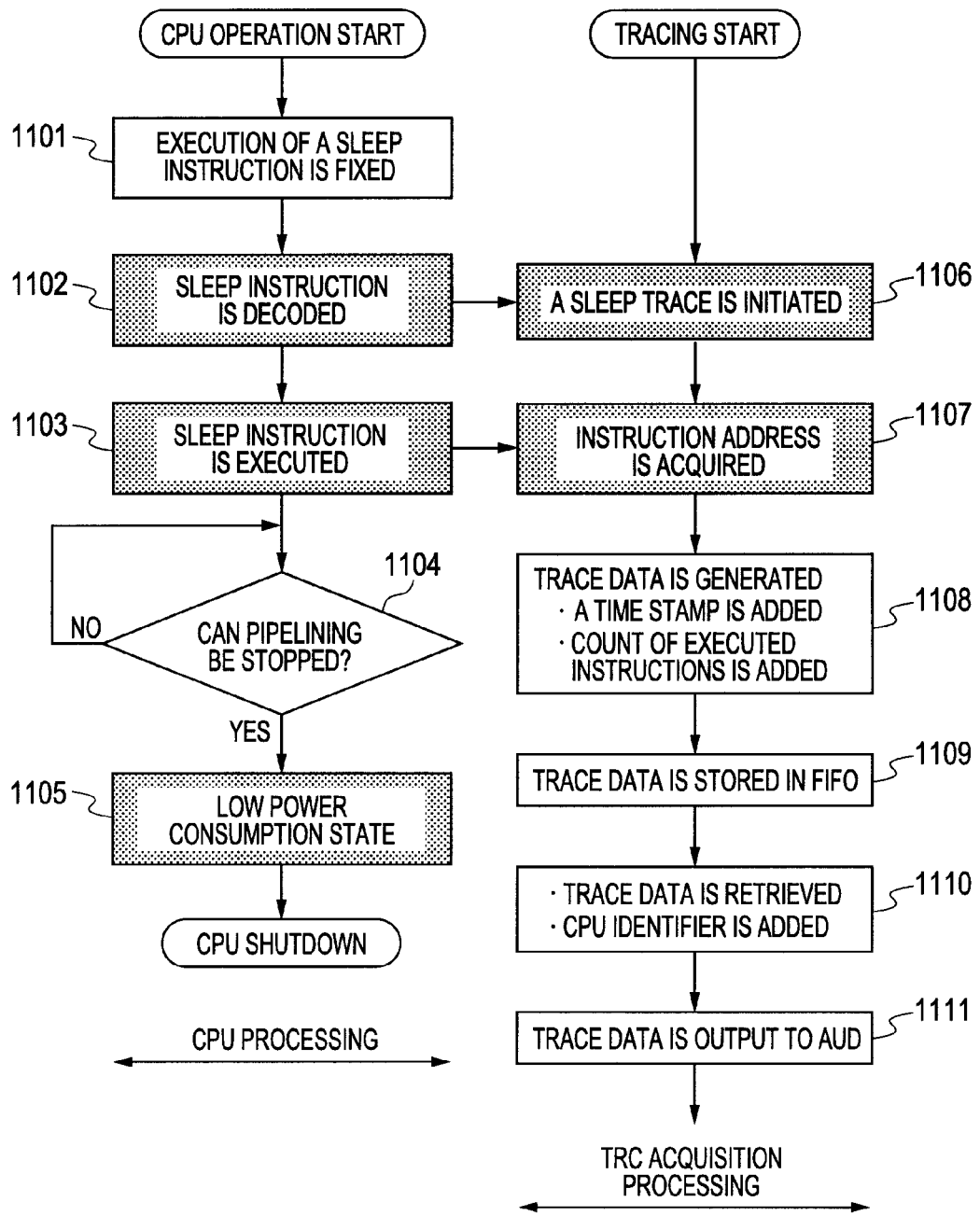
FIG. 11 is a flowchart illustrating the flow of a sleep trace in the microcomputer depicted in FIG. 1.

FIG. 11 illustrates the flow of a sleep trace.

First, the execution of a SLEEP instruction is fixed (1101) and the SLEEP instruction is decoded and executed (1102, 1103). Then, the control unit 101 (201) determines whether or not pipelining processing can be stopped (1104). If pipelining processing can be stopped, the CPU is caused to transit into a low power consumption (sleep) state (1105). The above steps 1101 to 1105 are performed as CPU processing. Meanwhile, in the debugging function unit 508, a SLEEP trace is initiated (1106) at the same time when decoding the SLEEP instruction begins in the above step 1102. The instruction address of the SLEEP instruction executed at the above step 1103 is obtained (1107). Then, in the trace acquisition circuit (TRC) 110 (210), trace data is generated (1108) by adding a time stamp and the count of executed instructions and then stored in the instruction execution analysis data FIFO 112 (212) (1109). Subsequently, the stored trace data is retrieved from the instruction execution analysis data FIFO 112 (212) and the CPU identifier is added (1110). Then, the trace data is output to the trace output unit 111 (212) (1111). The above steps 1106 to 1111 are performed as TRC acquisition processing.

Figure 12:
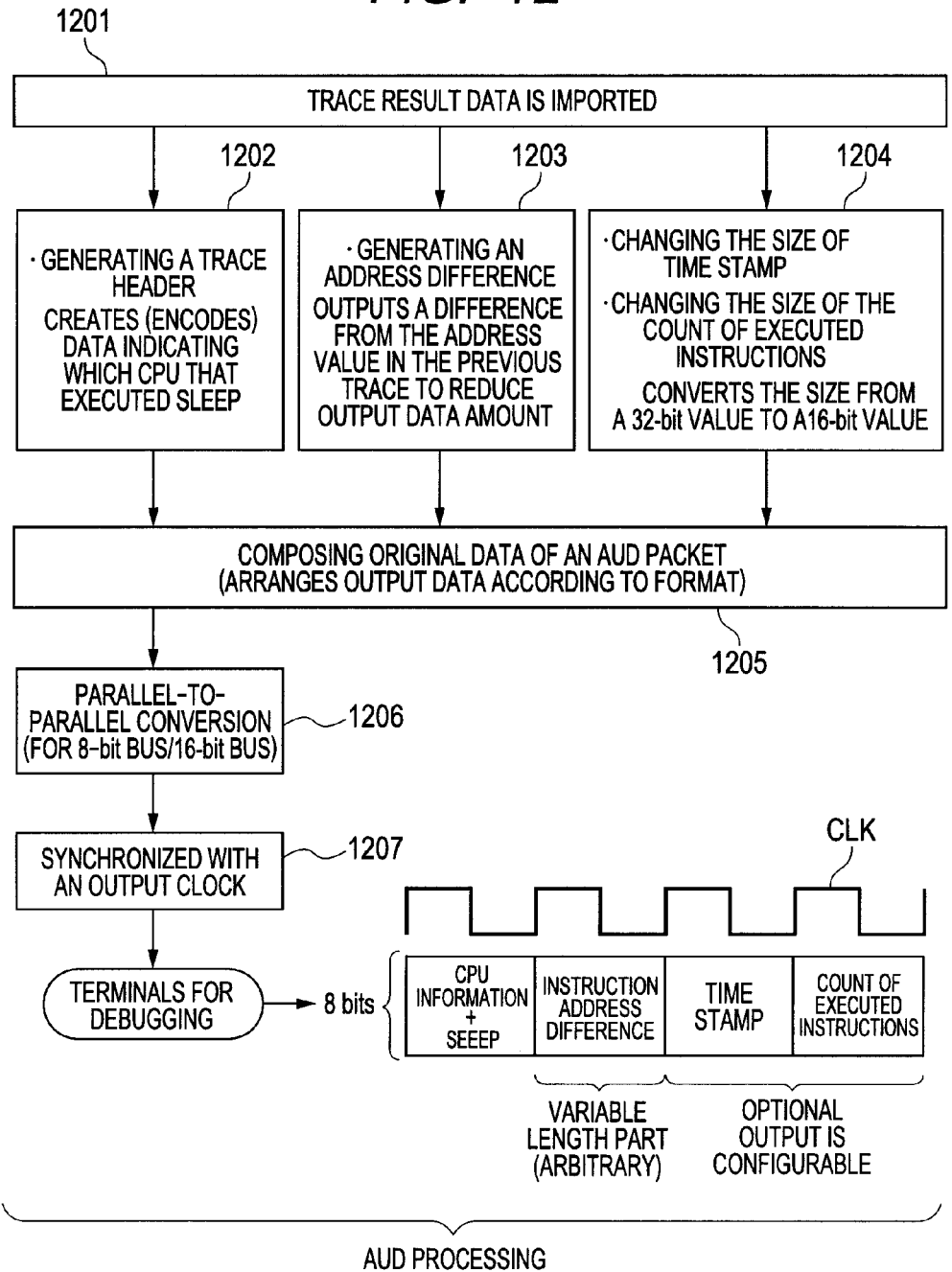
FIG. 12 is a flowchart illustrating the flow of processing by a trace output circuit (AUD) in the microcomputer depicted in FIG. 1.

FIG. 12 illustrates the flow of processing by the trace output circuit (AUD).

Here, by way of example, processing in a case where a result of execution of a SLEEP instruction was traced is illustrated.

When a result of execution of a SLEEP instruction was traced, the trace result is imported to the trace output circuit 111 (211) from the corresponding trace acquisition circuit 110 (210) (1201). Then, in the trace packet generating logic unit 116 (216), the following are performed: generating a trace header (1202); generating an address difference (1203); changing the size of the time stamp; and changing the size of the count of executed instructions (1204). In the step of generating a trace header (1202), data indicating which CPU that executed the SLEEP instruction is created (1202). In the step of generating an address difference (1203), a difference from the address value in the previous trace that was last output is obtained to reduce the output data amount and it is output. In the step of changing the size of the time stamp and changing the size of the count of executed instructions (1204), the size is converted from, for example, a 32-bit value to a 16-bit value. In the trace packet generating logic unit 116 (211), composing original data of an AUD packet is performed by arranging output data according to a predefined format (1205). Subsequently, in the parallel-to-parallel converter 117 (217), parallel-to-parallel conversion is performed (1206). By this parallel-to-parallel conversion, AUD packet data is converted to, for example, data for 8-bit bus or data for 16-bit bus. Then, AUD packet data is synchronized with an output clock CLK (1207) and delivered outside via the multiple terminals for debugging 44A, 44B, 44C (44D, 44E, 44F). In the output data format, instruction address difference is put in a variable length part (arbitrary) and optional output of the time stamp and the count of executed instruction is configurable.

Third Embodiment

Figure 2:
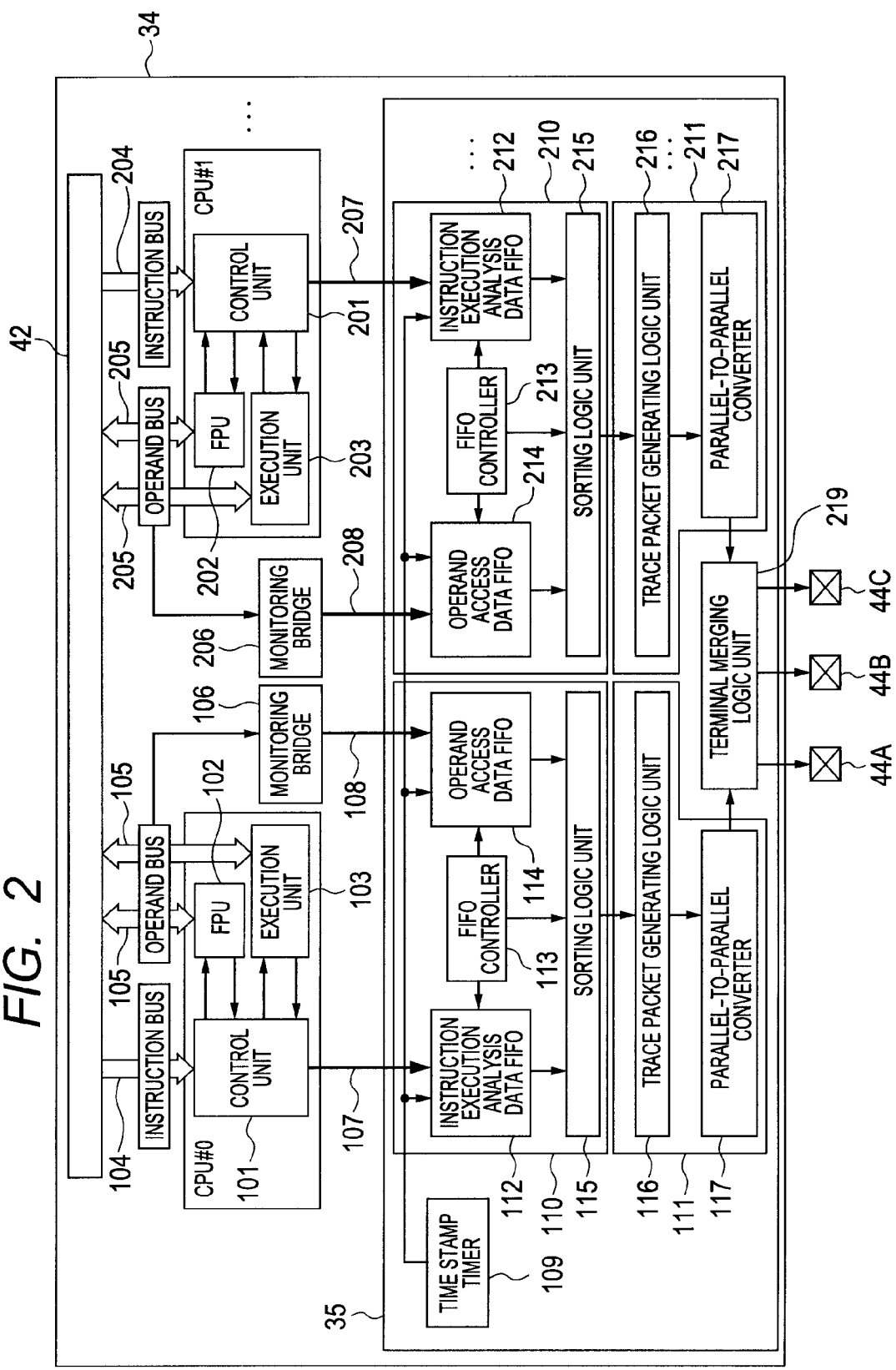
FIG. 2 is a block diagram depicting another example of a detailed structure of a main part of a microcomputer which is assumed as an example of an information processing device pertaining to the present invention.

FIG. 2 depicts another example of the structure of the main part of the microcomputer 34.

A significant difference of the microcomputer 34 depicted in FIG. 2 from that depicted in FIG. 1 lies in that a terminal merging logic unit 219 is provided and, by this terminal merging logic unit 219, the outputs of the parallel-to-parallel converter 117, 217 are merged and then delivered outside via the terminal for debugging 44A, 44B, 44C. In the terminal merging logic unit 219, the outputs of the parallel-to-parallel converter 117, 217 are time divided and merged. In this way, the number of the terminals for debugging which are used for delivering outside of trace data will become fewer as compared with the case that is depicted in FIG. 1.

While the invention made by the present inventors has been described specifically based on its embodiments hereinbefore, it will be appreciated that the present invention is not limited to the described embodiments and various modifications may be made without departing from the scope of the invention.

What is claimed is:

1. An information processing device comprising:
a central processing unit including an execution unit coupled to an operand bus, and a control unit that controls operation of the execution unit, based on fetched instructions; and
a debugging circuit that obtains trace data about how a program is executed in the central processing unit,
wherein said control unit comprises a debugging function unit that collects instruction execution analysis data in the central processing unit,
wherein said debugging circuit comprises: a trace acquisition circuit that imports instruction execution analysis data collected by the debugging function unit and data received from the operand bus via logic circuits which are used for separate purposes; and a trace output circuit for delivering outside the output of the trace acquisition circuit, and
wherein said trace acquisition circuit comprises a sorting logic unit that sorts instruction execution analysis data collected by the debugging function unit and data received from the operand bus in order of processing done by the central processing unit.

2. The information processing device according to claim 1, wherein said debugging circuit comprises, as said logic circuits which are used for separate purposes:
a first FIFO that takes in the instruction execution analysis data; and
a second FIFO that takes in the data received from the operand bus, and
wherein a time stamp which is based on time information managed by a time stamp timer shared within said debugging circuit is tagged to each individual unit of data which is taken in said first FIFO and to each individual unit of data which is taken in said second FIFO.

3. The information processing device according to claim 1, wherein said sorting logic unit sorts data units output from said first FIFO and data units output from said second FIFO into a sequence of trace data in order of processing done by the central processing unit, based on time stamps tagged to the data units output from said first FIFO and time stamps tagged to the data units output from said second FIFO.

4. The information processing device according to claim 2, wherein said central processing unit is configured to enable pipelining processing.

5. The information processing device according to claim 4, wherein said sorting logic unit determines an order of trace data units being after sorted, taking account of pipelining processing in the central processing unit, if a time stamp tagged to a data unit output from said first FIFO is identical to a time stamp tagged to a data unit output from said second FIFO.

6. The information processing device according to claim 5, wherein said sorting logic unit discerns a temporal inversion of trace times occurring between a data unit output from said first FIFO and a data unit output from said second FIFO due to pipelining processing in the central processing unit and determines an order of trace data units being after sorted.

7. The information processing device according to claim 6, wherein a plurality of central processing units are arranged, and
wherein said debugging circuit comprises a plurality of trace acquisition circuits and a plurality of trace output circuits arranged to correspond to the central processing units.

8. The information processing device according to claim 7, wherein said central processing unit performs processing comprising:
a first step of fetching and decoding a branch instruction by said control unit;
a second step of executing a branch process based on the branch instruction by said execution unit, accompanied by aborting decoding of subsequent instructions;
a third step of determining by said control unit whether or not pipelining processing can be stopped; and
a fourth step of fetching a branch destination instruction by said control unit, if pipelining processing can be stopped as determined at the third step, and
wherein said trace acquisition circuit performs processing comprising the steps of initiating a branch trace in response to the first step, and obtaining, in response to the second step, address of branch instruction, branch destination addresses, and branch type information of the branch instruction.

9. The information processing device according to claim 8, wherein said central processing unit performs processing comprising:
a fifth step of fetching and decoding a sleep instruction by said control unit;
a sixth step of executing the sleep instruction by said execution unit based on a result of the decoding at the fifth step;

a seventh step of determining by said control unit whether or not pipelining processing can be stopped; and an eighth step of transiting into a low power consumption state, if pipelining processing can be stopped as determined at the seventh step, and wherein said trace acquisition circuit performs processing comprising the steps of initiating a sleep trace in response to the fifth step and obtaining the instruction address in response to the sixth step.

10. The information processing device according to claim 7, further comprising a logic circuit for merging and delivering outside the outputs of the trace output circuits via common terminals.

* * * * *